United States Patent [19]

Korsky et al.

[11] 3,997,738
[45] Dec. 14, 1976

[54] LINE CIRCUIT FOR TELECOMMUNICATIONS EXCHANGE USING TDM

[75] Inventors: Viacheslav Korsky; Christopher Elmer, both of Guelph, Canada

[73] Assignee: International Telephone and Telegraph Corporation, New York, N.Y.

[22] Filed: Oct. 21, 1974

[21] Appl. No.: 516,163

[52] U.S. Cl. ................................................ 179/99
[51] Int. Cl.² .......................................... H04J 3/02
[58] Field of Search ............... 179/18 F, 18 FA, 99, 179/15 AT, 27 CA, 18 AD

[56] References Cited
UNITED STATES PATENTS

| 3,244,815 | 5/1966 | Anderson et al. | 179/99 |
| 3,385,935 | 5/1968 | Anderson et al. | 179/99 |
| 3,420,961 | 1/1969 | Averill, Jr. | 179/18 FA |
| 3,453,396 | 7/1969 | Lacey et al. | 179/99 |
| 3,715,516 | 2/1973 | Ebrahimi | 179/18 FA |
| 3,787,631 | 1/1974 | Lewis | 179/99 |
| 3,789,152 | 1/1974 | Medill et al. | 179/15 AT |
| 3,914,559 | 10/1975 | Knollman | 179/99 |

Primary Examiner—Kathleen Claffy
Assistant Examiner—Randall P. Myers
Attorney, Agent, or Firm—J. B. Raden; M. M. Chaban

[57] ABSTRACT

Disclosed is a line circuit providing the normal line circuit functions and key system control functions within an exchange using time division switching. The line circuit may be used interchangeably for key telephones or non-key telephones. In the former case, the circuit provides the well-known key telephone features for multiple line access at each station of a plurality of stations. Each line circuit provides electronic signalling controls, such as lamp flash indicating a call awaiting an answer, lamp wink indicating a line is on a hold condition, and the fully lit line busy indication, together with audible controls for a called line, and also provides an inverted flash signal at the line circuit for trouble or problem situations.

11 Claims, 5 Drawing Figures

LINE CIRCUIT FOR TELECOMMUNICATIONS EXCHANGE USING TDM

RELATED APPLICATIONS

The present invention has been designed for use in a time division telecommunications exchange of the type shown in U.S. Pat. application Ser. No. 512,061 filed Oct. 4, 1974, now U.S. Pat. No. 3,941,936 issued Mar. 2, 1976, based on the original filing of Canadian patent application Ser. No. 183,674 filed Oct. 19, 1973. That application shows an exchange employing time division principles with each time slot being assigned to a particular function circuit such as a register, a local link, a trunk and the like for completing the switching, signalling and speech functions of the exchange.

BACKGROUND OF THE INVENTION

In conventional telephone exchanges of the type in use at the present time, line circuit functions must be provided for each line to provide control and supervisory functions for that line. In addition, each line which is to be part of a key sub-system usually includes an added key control circuit or line card to provide the signalling and hold functions for that line.

These line card circuits usually include a plurality of relays to control ringing and lamp control, ring cut-off and hold control and signalling. In addition, the line card circuits include elements for sensing a hold condition to switch a holding bridge across the line to perform the holding of the line during the pendency of the hold condition.

Some line card circuits known in the art employ electronic components in place of relays to provide these control functions.

SUMMARY OF THE INVENTION

The present invention provides a line circuit for a telecommunications exchange which provides in addition to normal line circuit functions, all the functional controls of the line card circuit of a key telephone system.

The type of exchange to which the line circuit is mated is a TDM dual highway PBX or PABX exchange in which the line circuit performs a time controlled switching function to connect the line to the highways during the proper time intervals.

Within each line circuit, there is also provided switching capability for each of the dual highways. Actual switching of the highway connections at a line circuit is performed by FET devices, with local logic controlling the FET devices. Each line circuit thus has four FET's, one for origination and one for termination on each of the two highways used. An indication of the state of the line circuit is stored in the logic of the line circuit so that busy testing may be performed by having the central control interrogating the line circuit logic. Each line circuit also includes a PAM multiplexer and de-multiplexer for controlling the bi-directional transfer of speech signals.

It is therefore an object of the invention to provide a line circuit for a line of a telecommunications exchange, the line circuit including in addition to normal line circuit functions, all the necessary key telephone control facilities.

It is a further object of the invention to provide a line circuit for a TDM telephone system, the line circuit including signalling and lamp control capability for indicating a called line condition, a busy line condition and a hold condition, and to further provide hold control.

It is a further object to provide a line circuit having key system capability performed by solid state circuitry using only two relays.

It is a still further object of the invention to provide a key telephone line circuit for providing key control functions employing primarily solid state logic circuits.

These and other objects, features and advantages of the invention will become apparent from the following detailed description of the invention viewed in conjunction with the drawings, of which the following is a brief description.

BRIEF DESCRIPTION OF THE DRAWINGS

FIG. 2 is a showing of the relative positions of FIGS. 2A, 2B and 2C; while FIGS. 2A, 2B and 2C is a circuit diagram of a line circuit employing our invention.

DETAILED DESCRIPTION OF THE DRAWINGS

Figure 1:
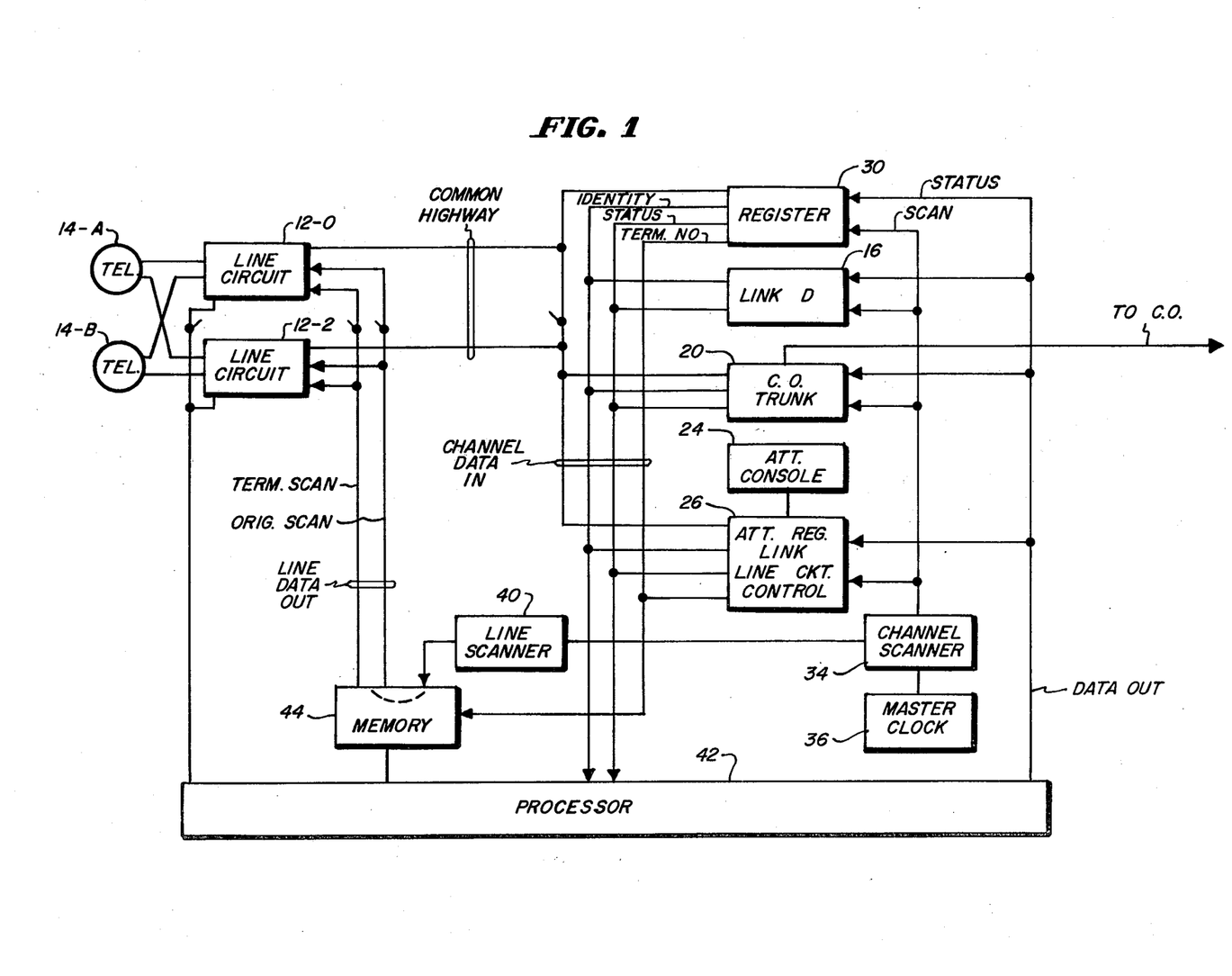
FIG. 1 is a schematic block diagram of a telecommunications system with which our line circuit may be used.

In order to understand the operation of our line circuit, we will briefly describe the operation of an exchange to which our line circuit may be applied. Such an exchange is shown in FIG. 1 in which we show a block diagram of a telecommunications exchange designed to service up to 100 lines in the form of a local exchange such as a PABX. Each line has a line circuit 12 interconnecting the telephone station 14 on that line to the exchange. Two such line circuits, 12-0 and 12-2, are shown as individual blocks in FIG. 1, each line circuit having connection to plural telephone stations, only one such station being shown for each line as denoted by reference numeral 14A and 14B. As is well-known in key systems, each of the key-equipped stations may have access to a plurality of telephone lines to the exchange through key buttons and lamps at each station.

As is conventional, there are provided a plurality of local links 16 (only one of which is shown) for completing and supervising local calls. In one exemplary system, up to twelve local links may be provided, each capable of controlling or supervising one local call. For calls to and from a remote central office, one or more central office (C.O.) trunks such as trunk 20 are provided.

An attendant position or console 24 may be provided, the console having connected thereto including at least one local link, line circuit and control circuit along with a register, these being collectively identified by the numeral 26. Explanation of the functioning of the attendants console and C.O. trunk are not necessary to the disclosure herein and need not be described herein. Also shown in FIG. 1 is one register 30 of a plurality of registers used to store called station information prior to use of that information to control switching.

The disclosed exchange uses TDM principles with a clock control providing 64 time slots, each time slot being of one micro-second duration. With an exchange comprised of 64 time slots per frame or cycle, a complete channel scan cycle of channel scanner 34 as controlled by master clock 36 occurs in 64 microseconds. One line is scanned during the final time slot of each channel scan frame by a line scanner 40, for idle or busy condition, so that a full line scan of the one hundred lines of the system plus as many as 10 tie lines, occurs in 7.04 milliseconds.

In the exchange disclosed, all talking or function circuits such as trunks, registers, local links, conference links, paging circuits, etc. are called function circuits, and each is assigned an individual time slot or channel unit. There are sixty-four of these time slots; however, only a maximum of sixty-two may be used for speech-carrying function circuits. As mentioned, one slot is used for line scan.

Within the exchange, most of the interconnection of the function circuits to the central processor 42 is by the use of common data bus leads connecting the processor 42 to the various channels. These circuits generate their own identity code by strapping or the like to emit an address signal when their time slot is reached.

The master clock 36 controls two scanning functions, the first being the channel scanner 34 which scans the channels sequentially and after a complete scan frame, increments the line scanner 40 by one to cause a line to be scanned during the last slot of each frame.

Each channel when scanned, transmits data along a common bus to the memory and in a parallel format from the recirculating memory to the processor. This data comprises: (1) The channel identity; (2) Status of the channel (free, busy, etc.); and (3) Station number (in the case only of registers).

The central control (processor) 42 processes data received from the channel by way of memory 44, essentially by transferring control from one function circuit to another, and uses a plurality of adjacent time periods to process data from each channel time slot such that data read out for channel No. 1 will be returned to memory for channel No. 1 during the read period of channel No. 4.

The purpose of the line scan is primarily to process "requests for service" from stations. On receipt of a request, the number of the calling line is stored in the memory 44 and information is transferred to a free register to connect the line circuit to a channel. Subsequent line scans past the number for the calling line no longer comprise requests for service, as a busy indication is now provided for that line.

Data is transferred from the memory 44 regarding function circuits to the processor 42 and back to memory in coded form (the processor and memory jointly forming the common control) over a plurality of bus leads, the bus leads being common to the function circuits and entitled "Channel Data In" in FIG. 1. This data comprises identity leads, status leads and terminating number data, using four leads for identity, four leads for status and four leads for hundred numbers, four leads for tens numbers and four leads for units. Data from the control to the function circuits is sent in uncoded form on twelve input leads symbolically shown in FIG. 1 by one lead entitled "Data Out". From the memory to the line circuits data is sent over the leads labeled "Line Data Out".

On a call being originated, and found by the line scan, a register is activated during the next time frame to process that call. The register remains in the call processing mode until all dialed digits are received and analyzed. If the call is a local one, three digits will have been dialed and the digits have been stored in the register. A busy test of the called line is initiated, and an idle local link is activated to supervise the call once an idle line has been found.

A line-to-line call may be traced generally in FIG. 1 as follows: Assume station 14A having access to line 12-0 wishes to communicate with a station 14B, having access to line 12-2. When station 14A goes off-hook, and depresses the line key or button connecting the station to that line, an originate lead in the line circuit 12-0 is enabled to apply a signal to the processor in response to the line scanner 40 which finds the calling line during its scan and determines the number of the calling line. The line number of line 12-0 is then stored in the memory. A proper free or busy signal on a busy sensing lead (F/B) to the processor indicates the line circuit 12-0 is now busy.

The processor 42 causes an idle register 30 to be transferred to control the call and applies dial tone enable signal to the signal input board (not shown) which applies dial tone via one path of the common highway and line circuit 12-0. Dial tone is routed to the common highway and to line circuit 12-0 only during the time slot allocated to the register 30 (one microsecond of every 64 microseconds). The units and tens outputs from the memory 44 corresponding to calling line 12-0 along with a receive enable signal, enables the line circuit 12-0 during the register time slot.

When dial tone is received by the calling line, the three-digit number of called line 12-2 with prefix 2 and the desired tens and units digits, is dialed, dial tone being removed when the first digit is dialed. The station of the calling line may dial using the facilities available for that line, i.e., either rotary dial pulses or multifrequency tones. When the calling line is equipped for rotary dial signalling, the dial pulses are applied to the register 30 via the line circuit 12-0 and the processor 42. When the station of the calling line is equipped for pushbutton MF tones, the multi-frequency tones are applied to the register through the line circuit, and over a first originate path of the common highway and a second terminate path of the common highway.

The register 30 counts the dialed pulses or MF information designating the called line and applies the information, in binary form to the processor and to the memory. When the dialed number is received, the processor, using status information received from the called line circuit determines that the called line is free. The processor transfers control of the call to a free local link, releases the register, and the recirculating memory stores the calling and called station numbers in the time slot allocated to the local link.

During the time slot allocated to the local link: The called line units and tens outputs stored in the memory enable the ringing circuits of the line circuit 12-2 causing interrupted ringing to be applied to the station or stations of the called line. The units and tens outputs from the memory denoting the calling line enable the talking path of the line circuit 12-0 and ringback tone is applied to the calling station on the calling line. This ringback tone is connected into the originate path of the common highway by the ring tone enable signal received from the processor.

When a station of the called line answers (by going off-hook), its off-hook condition is sensed and the local link removes its ring tone indication and removes the ringback tone from the calling line. The off-hook condition also removes ringing from the line locally within the line circuit. At this time, the line lamps will be illuminated to indicate line 12-0 at station 14-A as the calling line and line 12-2 at station 14-B as the called line.

During the time slot allocated to the local link, the units and tens outputs of the memory for the calling and called lines are applied to the calling and called line circuits respectively to periodically enable the path between these lines. In conjunction with the path enable signal, the talking circuits of both line circuits are enabled during the one microsecond time slot. Four leads or paths (transmit and receive for the origination (calling) and transmit and receive for the termination (called) of both line circuits are enabled and the power board connects the transmit-originate path of line circuit 12-0 to the receive-terminate path of line circuit 12-2 and connects the transmit-terminate path of line circuit 12-2 to the receive-originate path of line circuit 12-0. During the one microsecond out of every 64 microseconds during which the local link is enabled, the talking paths of the two stations are connected through a modulator at one line and a demodulator at the other.

When the call is complete and one station goes on-hook, the other station is locked out and receives busy tone if it doesn't go on-hook. The processor releases the local link and that link is free for another call.

Assume that when the originating station had dialed the desired number, the called station was busy. In this case, the processor would find the busy indication at the called line with the register enabled for that call. The processor causes a busy lockout signal to be returned to the calling line circuit and busy tone is applied from the line circuit to the calling station.

Assume that the originating station had dialed an unavailable number. In this case, the processor would determine that the called number is unavailable and would return an unavailable lockout signal to the calling line circuit. Reorder tone from the system tone control supply would be applied locally to the calling station.

Figures 2, 2A:
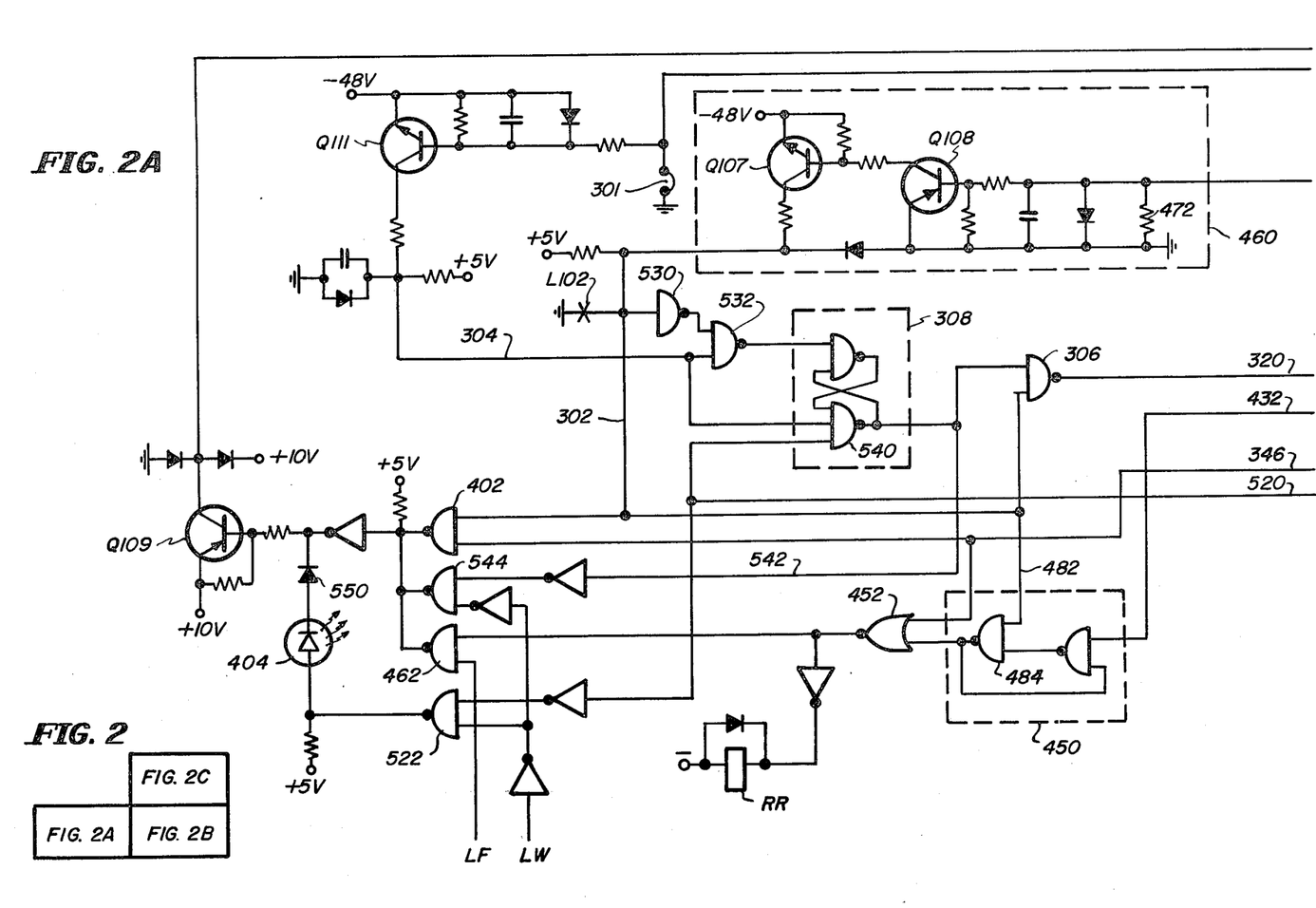
Figure 2B:
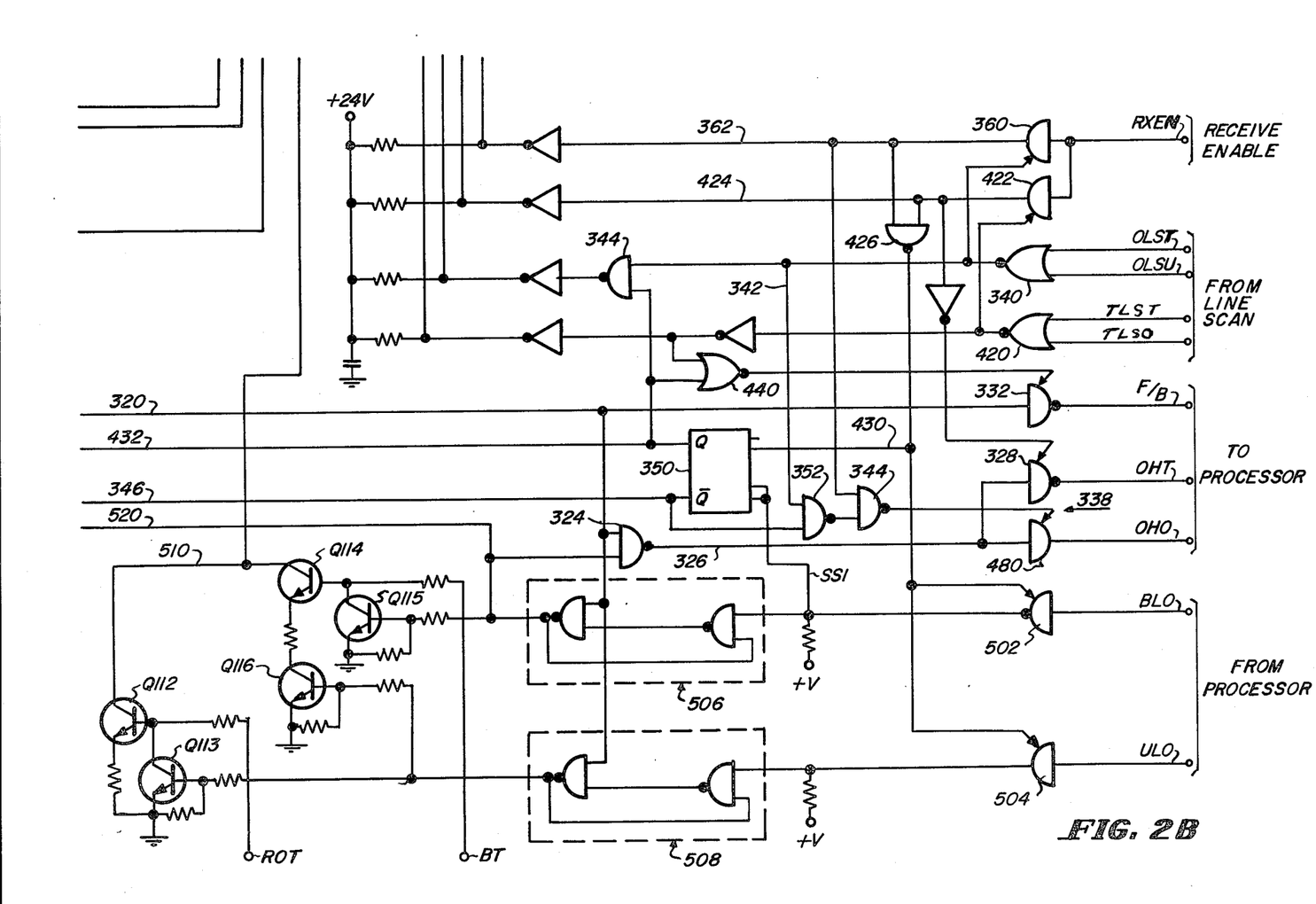
Figure 2C:
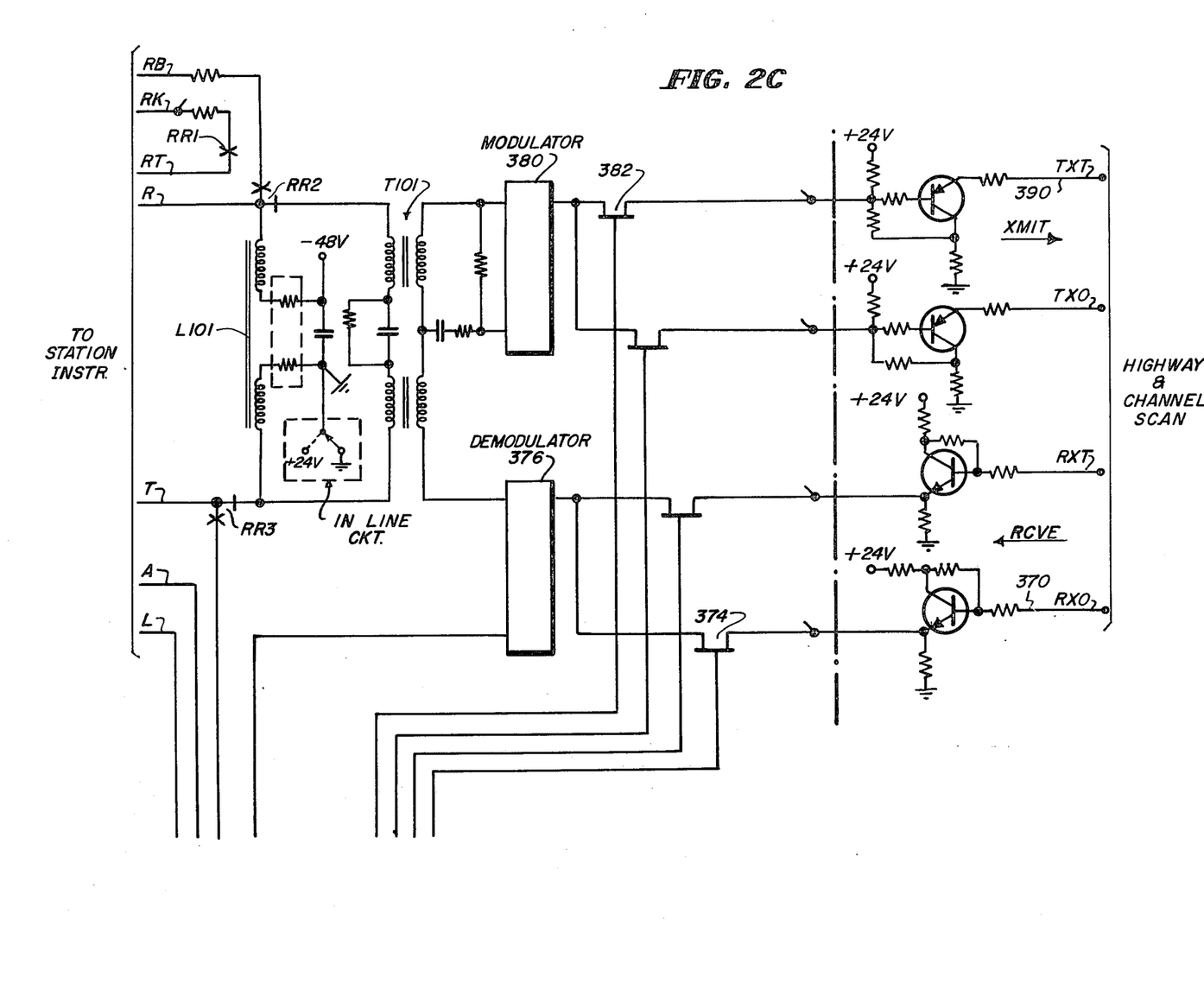

Each line circuit as disclosed in detail in FIGS. 2A-2C herein may be used for either a single line telephone or for the plural telephones of a multiple line access key system. In either event, the station instrument is a conventional one of either type as is widely known and used in the United States. For single line usage, the T and R leads are provided from line circuit to station instrument, and additional ring leads if desired.

For key systems, in addition, an A lead, a lamp L lead and multiple ringing leads may extend from each line circuit to each station having access to the line. The lamp lead from a line circuit is coupled to the line lamp and button representing that line, while the A lead is connected through keys at the station including a hold key to a source of ground.

When the line circuit is being used with a single line telephone, the 301 strap (FIG. 2A) is closed to provide a ground on the A lead at the line circuit at all times. The A lead need not be extended to the telephone station instrument. Naturally, the L lead is not extended from the line circuit since there is no lamp at the station.

On an outgoing call from the station, (off-hook) the loop across leads T and R at the station is closed, and the closed loop closes a circuit to the line inductor relay L101, the relay having two windings, both in series with the respective T and R leads of a closed loop line and across a DC bias source. Relay L101 on loop closure operates and closes its single contact set L102 (FIG. 2A). Closure of these contacts places ground on lead 302 to the lower input of NAND gate 306.

The previously-mentioned permanent ground through the strap 301 retains transistor Q111 conductive. With this transistor conductive, ground is placed on lead 304 but this ground has no effect at this time.

Ground on lead 302 (from closed contacts L102) causes the lower input terminal of gate 306 to reach its low voltage state. The normal condition of latch 308 provides a high voltage condition on the upper terminal of gate 306 and a low condition on lead 320. When the ground appears on lead 302, and this ground coincides with a ground on lead 304 (signifying that the station is off-hook), the latch 308 changes condition. As a result, a high condition appears on output lead 320 to the free or busy gate 332. The high condition on lead 320 is passed to the upper terminal of gate 324. The high condition on lead 520 is passed to the lower terminal of NAND gate 324 causing its output 326 to go to its low condition and placing a low condition on the input to gate 328 and to gate 480.

The many gates 332 and 328 and 480 are so-called tri-state devices, each having a gated control terminal. When the control gates are enabled, any signal on the input terminal will be emitted. Thus, in a time division system such as the present one, the control terminals of gates 332 and 328 are enabled during the particular time slot allotted to the line circuit to enable output from the device during the proper time slot and providing the free/busy indication from device 332 and an off-hook indication from gating device 328 or 480.

As mentioned previously, the final time slot is delegated to line scan and during each sequential time frame, one line is scanned. When the line scan reaches a particular line, such as that one originating the call, its originating line scan leads OLST and OLSU (tens and units) of the NOR gate 340 are enabled to transmit a signal on lead 342 to NAND gate 344. Monostable circuit 350 is in its normal condition and thus, lead 346 from the monostable circuit 350 passes a high condition output to one input of NAND gate 352.

The input passed through NOR gate 340 also enables the gate of the tri-state device 360 to provide an input on lead 362 during the particular scan period. This output on lead 362 is also fed to NAND gate 344. The output of gate 352 is fed to the gate terminal 338 via gate 344 and enables gate 480 to emit an off-hook signal to the processor indicating that the line of the line circuit of FIGS. 2A–2C is seeking service.

When a line circuit seeking service is noted by the processor, the processor assigns a register to handle the digit storage for that call.

When a register is seized, the calling number is stored in its memory. Dial tone is applied over the RxO lead 370 during the channel scan time slot representing the seized register. Also, FET 374 is actuated in this time slot. Dial tone passes through FET 374 to demodulator 376 and is filtered and fed back to the calling line through transformer T101.

If the calling station is equipped with a rotary dial or other means for producing interrupted dial pulses, inductor relay L101 follows these pulses by restoring and re-operating. These pulses are forwarded through gate 480 during the register time slot and are passed through the processor to the register and are stored in the register, and the call is processed in the manner described in the co-pending application noted.

If the calling station is equipped with pushbutton tone dialing, relay L101 is not interrupted. Instead, tones from a standard tone generator (not shown) associated with the calling line pass through the transformer T101 and modulator 380, FET 382 and transistor 384 to lead 390 and the highway for receipt by the register.

The dialed information is stored by the register, which then transfers the calling and called line data to a local link for processing the call. The local link periodically enables the highway leads TxT, Txo, Rxo and Rxt and RxEn during the proper time slot of the link to allow speech communication in a PAM mode through the modulator and demodulator in the line circuit. When the local party restores by releasing the loop, relay L101 restores to open contacts L102. In this way, the off-hook indication from the line circuit is removed, and the link terminates the connection.

If the calling line is equipped to provide key telephone service, the 301 strap is removed so that ground is not normally present on the A lead to the station instruments, but instead the A lead is switched in the station instrument in a conventional manner.

When a key station goes off-hook, ground is applied to the A lead from the station instrument. This ground causes transistor Q111 to operate. As is known in the key systems art, closure of the loop follows in time the ground on the A lead. Closure of the line loop causes relay L101 to operate. The ground or low condition at closed contacts L102 passes over lead 302 to one input of NAND gate 402. The output of mono-stable 350 on lead 346 remains high providing a second input to gate 402 turning the gate on. With the gate on, a signal is provided to lamp 404 on the line circuit board to indicate the line circuit condition. The signal is also forwarded to transistor Q109 turning it on and providing a +10 volt signal on the lamp lead to operate the line lamp for the line circuit shown, at all stations at which that line has an appearance. The line lamp will be held steadily by this +10 volts through transistor Q109.

When the present line circuit is a terminating or called party, the operative sequence is as follows: The called local line is tested by the processor for busy condition over lead F/B. The F/B lead signals the condition of the off-hook sensing contacts L102 through the condition of hold latch 308 by way of lead 306. This testing of the condition of gate 306 over the F/B lead is undertaken prior to the assigning of a link circuit to handle the call. Assuming that the line of the disclosed line circuit is idle, and is being called, the terminating line scan leads (TLST and TLSU) to NOR gate 420 are activated to enable the gate terminal of gating device 422. When the time-controlled RxEn signal is received, an output is passed through gating device 422 onto lead 424 and one input of NAND gate 426. When the signal input to gate 422 ends, gate 426 is activated by the input change of state on lead 430 to change the condition of monostable circuit 350 to its non-stable state.

The signal output of the circuit 350 changes to render lead 346 low and to cause lead 432 to reach a high condition indicating terminating seizure of the line circuit. First, an enabling pulse to the gate of tri-state device 332 is emitted through NOR gate 440 to mark the line circuit as busy to all incoming calls by due to the enabling of the gate 332 for emitting a high condition signal during a scan of the FB lead.

It should be noted that if the line is busy, a high condition on lead FB to the processor provides the busy indication during scan of the line circuit. A low condition on F/B lead indicates the line is free.

Lead 432 is now in a high condition signifying that a ringing condition is in process. The gate 452 at the latch 450 output receives a low condition from the latch and a low from lead 346 (leads 346 and 432 always exhibiting an opposite condition relative to one another). Gate 452 emits an output high condition to cause ring relay RR to operate.

Relay RR operates its three sets of contacts RR1, RR2 and RR3. RR1 is a normally open set of contacts which close to complete an audible signalling path from the RK lead to the RT lead and the station ringer (not shown). Contacts RR2 and RR3 are transfer contacts which open the speech path from the station through transformer T101 and close a path to the ring trip circuit 460. Relay RR is held operated during the entire ring period.

The output high condition from gate 452 (at the input to ring relay RR) is also fed to one input of NAND gate 462. The other input lead to this gate is periodically fed with lamp flash input pulsed at the conventional flash rate. The output of gate 462 flashes transistor Q109 which follows the flash input, thereby flashing the lamp lead L to the station line lamp for the line being rung.

Thus, both audible and visual signals are provided to stations having access to the called line. When the called station answers, the loop across the T and R leads is closed in the instrument by any conventional method. The closed loop provides a path from the DC ring battery on lead RB through switched contacts RR2, looped R and T leads, switched contacts RR3 to resistor 472 and ground. The battery is impressed on the base of transistor Q108 and turns this transistor on to turn transistor Q107 on also.

With transistor Q107 on, the ground condition to lamp input gate 402 switches the board lamp and the line lamp to a steady condition. The ground or low condition from contacts L102 on lead 302 passes to lead 482 and gate 484 to gate 452 to shut off relay RR. Relay RR restores its contacts RR1, RR2 and RR3 to the normal condition and ringing and visual ring signalling are terminated, the latter having been transferred to a steady lamp indication through transistor Q109. Also, when the RxEn signal is passed by gate 422 on an indication from gate 420, an output is sent out from gate 328 to indicate the terminating off-hook condition of the line circuit to the processor.

During the normal call processing, signals from the processor are fed during each enabling time period from gate 426 to enable the gate terminals of gating devices 502 and 504. When the gating devices are enabled, they are open to lockout signals from the processor on leads BLO and ULO. When any lock-out signals such as from a vacant level, restricted level or disabled line are received from the processor through enable gates 502 and 504 of a calling line, latches 506 and/or 508 are triggered accordingly. When these latches are triggered, their output signals are fed to the bases of transistors Q113, Q115 and Q116. Normally conducting transistors 113 and 115 are turned off by this signal. With transistor Q113 off, transistor Q112 turns on to place reorder tone from lead ROT to lead 510 and demodulator 376. This tone is fed back to the calling station to indicate the unavailable line.

The signal from latch 506 also passes over lead 520 to one input of NAND gate 522. The other input of gate 522 is fed from the lamp wink input LW to send an input through LED 404. This signal to the LED is inverted relative to its normal wink rate to indicate that the called circuit is in a lockout condition.

The other condition which differentiates between a single line station and multiple line key operation is the lineholding capability. At the time of initiation of hold, the T and R leads are looped and ground is present on the A lead. The hold button of a station is depressed when a line has been in use. Depression of the hold button opens the A lead removing the ground from this lead. The line loop remains closed across the T and R leads.

Removal of the A lead ground releases transistor Q111. With transistor Q111 off, a high condition is impressed on lead 304. The line loop remains closed temporarily, keeping contacts L102 closed to provide ground on an input to gate 530 to pass a signal through to one input of gate 532. When this signal coexists with the high condition on lead 304 at the other input to gate 532, an output low signal is produced by gate 532 to trigger the hold latch 308. In the operated condition of latch 308, the output of gate 540 becomes low. This low voltage condition is transmitted on lead 542 to one input of gate 544. The other input of gate 544 receives a signal pulsed at the direct lamp wink rate to pulse both board lamp 404 and the lamp on lead 301 through transistor Q109. This transistor follows the wink pulses.

The line remains held since the conditions of the OHO and F/B lead to the processor are unchanged due to the condition of monostable device 350. This device retains the busy status of the line once actuated. The status of this monostable is not changed by the hold condition of the line even after the line loop is opened for the held line, a condition which occurs shortly after opening of the A lead. This sequence on hold is, of course, known in the art. In addition, since the monostable holds the line circuit in the hold condition until released, it is unnecessary to place a hold impedance across the line to retain the line circuit in the hold condition.

When it is desired that a held line be returned to the conversation mode, the line button is again depressed. Ground returns to the A lead and the hold latch 308 is restored by the ground on lead 304. The lamp wink is released over an obvious path.

If a line being held goes on-hook after re-selection of a line button, the line loop is briefly closed to operate relay L101. Thereafter when the station goes on-hook, ground is removed from the A lead, the line loop is opened and relay L101 restores. The line circuit then restores to its normal at-rest condition and monostable 350 is restored when the line circuit is stopped from being scanned during a channel time slot.

When during a hold condition at the local line circuit, the other station goes on-hook, then a BLO signal is received by gate 502 during the proper time period of the link or trunk servicing the call. This signal on lead BLO passes through latch 506 and lead 520 to one input of hold latch 308, causing the hold latch to restore. With the hold latch restored, the line circuit is restored from its hold condition. Since the line loop is now open, relay L101 is also restored and the contacts L102 remain open. The BLO signal to gate 502 also is sent on lead 551 to restore circuit 350 to its idle condition.

The release of the hold latch also restores gate 544 to remove lamp flash from the station lamp. The BLO signal causes the inverted lamp wink in the manner previously described.

If, however, during a call, the remote line had restored and the local line had not, the local line loop remains closed. The processor noting this condition (remote line released, local line still off-hook) sends a signal on the BLO lead to the unreleased line circuit. During the proper time slot, the signal passes through gate 502 to latch 506. The output of latch 506 emits a low signal and remains in the low output signal condition. This low signal turns off transistor Q115 and allows busy tone from the BT lead to pass through transistor Q114 to lead 510 to demodulator 376 to apply a busy tone to the off-hook line.

The change of condition of latch 506 removes the OHO signal from gate 328 to signal the processor accordingly. The latch change signal is also transmitted on lead 520 to gate 522 to produce inverted lamp wink to lamp 404. The inverted lamp wink signal has no effect on the line lamp which remains lit continuously due to rectifier 550 and its back bias. When the line goes on-hook, the line circuit restores in the normal manner, the latch 506 being restored also.

The function of the monostable 350 is to provide an indication that the line circuit is in alignment with a channel time slot. The monostable is activated when it is first scanned in a channel time slot, this active state persists for a time period that is greater than the period between two sequential channel scan periods. Accordingly, after the first time channel scan, the monostable 350 is retriggered on each subsequent channel scan and since the active state persists for longer than the period between two sequential channel scans, the monostable presents a constant indication that the line circuit is in alignment with a channel, or in use.

When the channel scan ceases, as in the cases when a channel circuit (link, trunk, etc.) has terminated, the connection and the calling and called numbers are removed from the memory. Monostable 350 is no longer retriggered and thus, soon restores to its idle state.

The monostable is initially triggered when the line circuit is scanned and either gate 340 or 420 is activated and is coincident with the signal RXEN, thus producing a trigger signal to monostable 350 on lead 430 from gate 426. However, during a line scan, when the processor is searching for requests for service, the RXEN lead is not activated, thus the enabling of gate 340 does not trigger the monostable 350.

The use of a monostable in the line circuit simplifies the control function of the processor since it is not necessary to restore the line circuit from the processor, the line circuit becomes self-restoring. This feature also reduces the possibility of the line circuit being falsely activated by a source spurious electrical noise.

Certain other features of the operation of the line circuit should be noted. If a line is busy, its response to the system is identical to that of a vacant line position, i.e., absence of signal. In this manner, no distinction need be made between the two as the response of the system to either a busy line or a vacant line position is the same. The system response is to return a busy tone to calling line and to process the call no further. The calling line is locked out of further processing.

It should be noted that the present line circuit is designed for use with conventional key telephone station instruments. In this way, the control of the opening of the station loop during hold may be produced in the conventional manner. In a conventional key telephone instrument, the hold button is depressed to open the A lead while maintaining the line loop at the station using the line closed temporarily. The present line circuit uses this same principle of intially opening of the A lead while the line loop at the station remains closed. In the present circuit, relay L101 remains operated by the closed loop and contacts L102 remain closed. This combination of conditions triggers the hold latch 308 on removal of the A lead ground from transistor Q111. The hold button at the station conventionally is a non-locking button which restores after its momentary depression. Restoration of the hold button opens line contacts at the station instrument in the usual manner and the resulting open loop causes release of relay L101 in the line circuit. Relay L101 restores and opens its contacts L102. Thus, the talking path to the station which had been using the line circuit is interrupted for the duration of the hold.

We claim:

1. A line circuit for providing line circuit functions for a telephone line within a time division-controlled telecommunications system, said line circuit also providing key telephone functions within said system using time division signalling and control at cyclic intervals, said line circuit comprising means for busying said line and its line circuit to the system in response to any one of the following conditions: an off-hook condition at a station of said line, a hold condition imposed at a station of said line, or in response to an incoming call condition to said line, and wherein there is further means responsive to any one of the three conditions for holding said line circuit and its line in a busy condition for a period greater than one of said cyclic intervals.

2. A line circuit as claimed in claim 1 in which there is an off-hook detector and a hold condition detector, and a common latch responsive to a signal from either of said detectors for providing a line circuit busying signal to said holding means.

3. A line circuit as claimed in claim 2 wherein there is strap means insertable for inactivating said hold condition detector to prevent a hold condition being imposed on said line circuit from stations of said line.

4. A line circuit for providing line circuit functions for a line of a time division telephone system and for providing key telephone functions to the line of said line circuit, said line circuit including a line relay responsive only to closed loop condition at a station of said line for operating its contacts to complete a path for maintaining said line circuit in a busy condition to said system, the closed loop at said station being opened responsive to a hold request from said station, means responsive to said hold request from an off-hook station of said line for maintaining said line circuit in a busy condition to said system, said line relay responsive to said hold request for releasing and opening its contacts with the loop open on the held line, and said line relay being inoperative in response to an incoming call condition to said line.

5. A line circuit as claimed in claim 4 in which there is a ring relay operative responsive to an incoming call condition on said line circuit, and means responsive to the operation of said ring relay for connecting a source of signalling current to additional stations of said line.

6. A line circuit as claimed in claim 5, further including a lamp conductor directed to stations of the line, and an array of gates for controlling the signals applied to said lamp conductor, a first gate of said array enabled by operation of a ring latch and a source of lamp flash current to emit a ring signal to said lamp conductor, a second gate of said array enabled by operation of a hold latch and a source of lamp wink current to emit a hold signal to said conductor, and a third gate of said array responsive to closure of said line relay contacts for emitting an off-hook signal to lamp conductor.

7. A line circuit for performing normal line circuit functions for a line within a time division controlled telecommunications system and for providing key telephone functions for said line, said line circuit including a plurality of speech conductors directed toward said system, and a plurality of supervisory conductors for receiving supervisory and control signals from said system and for transmitting supervisory and control signals to said system, said supervisory conductors comprising a first conductor for enabling certain of said speech conductors and supervisory conductors during a time division channel time slot within a time division cycle of predetermined duration, said supervisory conductors further including a busy-idle indicating conductor, and means for impressing on said last-mentioned conductor a busy indication during said channel time slot responsive to an incoming call condition to said line circuit or to either an off-hook condition or to a hold condition imposed from a station of said line.

8. A line circuit as claimed in claim 7 wherein said last-mentioned means comprises a monostable circuit rendered operative during said channel time slot and maintained operative for a period longer than said predetermined cycle duration.

9. A line circuit as claimed in claim 7, comprising a ring latch maintained operative by said monostable circuit during an incoming call, and a hold latch responsive to said off-hook or hold condition at a station.

10. A line circuit for interfacing between a telephone line and a time division system and for providing key telephone functions to said line, means for busying said line circuit to said system including first and second condition sensing means for operating said busying means on response of both said first and second means, both said first and second means responsive to an off-hook condition at a station of said line for cooperating to provide a first indication of said off-hook condition, said busying means actuated on the response of both said first and second means to provide signals indicative of said off-hook condition, both said first and second means responsive to said station going into a hold condition for releasing and for causing said busying means to remain operative during said release, said busying means operative for maintaining said line circuit busy during said hold condition, and means for permanently operating said first means when stations of said line are not equipped for a hold condition to render said busying means responsive only to said second means.

11. A line circuit as claimed in claim 10 in which said second means comprises a line relay responsive to a station of said line going off-hook for closing its contacts.

\* \* \* \* \*